US011072562B2

(12) United States Patent
Andersen et al.

(10) Patent No.: US 11,072,562 B2
(45) Date of Patent: Jul. 27, 2021

(54) CEMENT-BASED TILE

(71) Applicant: The Intellectual Gorilla GmbH, Sempach Station (CH)

(72) Inventors: Per Just Andersen, Dorfen (DE); Evan R. Daniels, Dallas, TX (US)

(73) Assignee: The Intellectual Gorilla GmbH, Sempach Station (DE)

( * ) Notice: Subject to any disclaimer, the term of this patent is extended or adjusted under 35 U.S.C. 154(b) by 0 days.

(21) Appl. No.: 16/747,329

(22) Filed: Jan. 20, 2020

(65) Prior Publication Data
US 2020/0181021 A1 Jun. 11, 2020

Related U.S. Application Data

(63) Continuation-in-part of application No. 15/315,536, filed as application No. PCT/US2015/034397 on Jun. 5, 2015, now Pat. No. 10,538,459.

(60) Provisional application No. 62/007,984, filed on Jun. 5, 2014.

(51) Int. Cl.
| | |
|---|---|
| C04B 28/14 | (2006.01) |
| C04B 14/06 | (2006.01) |
| C04B 16/06 | (2006.01) |
| C04B 41/00 | (2006.01) |
| C04B 41/61 | (2006.01) |
| B28B 3/22 | (2006.01) |
| B28B 11/08 | (2006.01) |
| B28B 11/24 | (2006.01) |
| B28B 11/18 | (2006.01) |
| B28B 11/04 | (2006.01) |
| B28B 11/00 | (2006.01) |
| C04B 14/28 | (2006.01) |
| C04B 103/24 | (2006.01) |
| C04B 111/00 | (2006.01) |
| C04B 111/60 | (2006.01) |

(52) U.S. Cl.
CPC ............... *C04B 28/14* (2013.01); *B28B 3/22* (2013.01); *B28B 11/001* (2013.01); *B28B 11/048* (2013.01); *B28B 11/0845* (2013.01); *B28B 11/18* (2013.01); *B28B 11/245* (2013.01); *C04B 14/06* (2013.01); *C04B 14/28* (2013.01); *C04B 16/0641* (2013.01); *C04B 41/009* (2013.01); *C04B 41/61* (2013.01); *C04B 2103/24* (2013.01); *C04B 2111/00594* (2013.01); *C04B 2111/60* (2013.01); *C04B 2201/50* (2013.01)

(58) Field of Classification Search
CPC ....... B28B 11/18; B28B 11/0845; B28B 3/22; B28B 11/001; B28B 11/16; B28B 11/048; B28B 11/245; B28B 1/52; E04C 2/044; C04B 41/009; C04B 2201/50; C04B 2103/24; C04B 2111/00594; C04B 28/14; C04B 16/0641; C04B 41/61; C04B 14/28; C04B 14/06; C04B 2111/60
See application file for complete search history.

(56) References Cited

U.S. PATENT DOCUMENTS

| | | | |
|---|---|---|---|
| 1,048,923 | A | 12/1912 | Wheeler |
| 3,517,468 | A | 6/1970 | Woods |
| 3,852,083 | A | 12/1974 | Yang |
| 3,908,062 | A | 9/1975 | Roberts |
| 3,987,600 | A | 10/1976 | Baehr |
| 3,994,110 | A | 11/1976 | Ropella |
| 4,014,149 | A | 3/1977 | Yamamoto |
| 4,045,937 | A | 9/1977 | Stucky |
| 4,075,804 | A | 2/1978 | Zimmerman |
| 4,084,571 | A | 4/1978 | McFarland |
| 4,159,302 | A | 6/1979 | Greve et al. |
| 4,171,985 | A | 10/1979 | Motoki |
| 4,225,247 | A | 9/1980 | Hodson |
| 4,225,357 | A | 9/1980 | Hodson |
| 4,284,119 | A | 8/1981 | Martin et al. |
| 4,302,127 | A | 11/1981 | Hodson |

(Continued)

FOREIGN PATENT DOCUMENTS

| | | |
|---|---|---|
| CA | 2799983 A1 | 12/2012 |
| CN | 101113077 A | 1/2008 |

(Continued)

OTHER PUBLICATIONS

European Extended Search Report for EP 14854429.9 dated Jun. 1, 2017.
Extended European Search Report for EP 13845068 dated Oct. 16, 2016.
Extended European Search Report for EP 14759514.4 dated Sep. 23, 2016.
International Search Report for PCT/US2007/004605 dated Oct. 4, 2007.
International Search Report for PCT/US2012/059053 dated Mar. 21, 2013.

(Continued)

*Primary Examiner* — Vishal I Patel
(74) *Attorney, Agent, or Firm* — Daniel J. Chalker; Edwin S. Flores; Chalker Flores, LLP

(57) ABSTRACT

A cement-based tile formed from a mixture comprising: a cement in the range of about 0.1 to 88% by wet weight percent; a secondary material in the range of about 0.1 to 50% by wet weight percent, the secondary material comprising limestone, sand, silica sand, gypsum, silica fume, fumed silica, Plaster of Paris, calcium carbonate, fly ash, slag, rock, or a combination thereof; a reinforcement fiber in the range of about 0.5 to 20% by wet weight percent, the reinforcement fiber comprising cellulose fiber, glass fiber, plastic fiber, polypropylene fiber, polyvinyl alcohol (PVA) fiber, homopolymer acrylic fiber, alkali-resistant fiber, or a combination thereof; a rheology modifying agent in the range of about 0.5 to 10% by wet weight percent; a water in the range of 10 to 60% of a total wet material weight; and wherein the mixture is extruded or molded to form the cement-based tile.

46 Claims, No Drawings

(56) References Cited

U.S. PATENT DOCUMENTS

| | | |
|---|---|---|
| 4,308,065 A | 12/1981 | Walls-Muycelo |
| 4,339,487 A | 7/1982 | Mullet |
| 4,343,127 A | 8/1982 | Greve et al. |
| 4,347,653 A | 9/1982 | Martin et al. |
| 4,398,842 A | 8/1983 | Hodson |
| 4,416,695 A | 11/1983 | Ball et al. |
| 4,428,775 A | 1/1984 | Johnson et al. |
| 4,434,899 A | 3/1984 | Rivkin |
| 4,443,992 A | 4/1984 | Shechter |
| 4,489,121 A | 12/1984 | Luckanuck |
| 4,552,463 A | 11/1985 | Hodson |
| 4,660,338 A | 4/1987 | Wagner |
| 4,664,707 A | 5/1987 | Wilson et al. |
| 4,695,494 A | 9/1987 | Fowler et al. |
| 4,704,834 A | 11/1987 | Turner |
| 4,716,700 A | 1/1988 | Hagemeyer |
| 4,716,702 A | 1/1988 | Dickson |
| 4,800,538 A | 1/1989 | Passmore et al. |
| 4,811,538 A | 3/1989 | Lehnert et al. |
| 4,864,789 A | 9/1989 | Thorn |
| 4,889,428 A | 12/1989 | Hodson |
| 4,896,471 A | 1/1990 | Turner |
| 4,922,674 A | 5/1990 | Thorn |
| 4,944,595 A | 7/1990 | Hodson |
| 4,946,504 A | 8/1990 | Hodson |
| 4,998,598 A | 3/1991 | Mardian et al. |
| 5,061,319 A | 10/1991 | Hodson |
| 5,066,080 A | 11/1991 | Woodward |
| 5,074,087 A | 12/1991 | Green |
| 5,100,586 A | 3/1992 | Jennings et al. |
| 5,108,677 A | 4/1992 | Ayres |
| 5,154,358 A | 10/1992 | Hartle |
| 5,169,566 A | 12/1992 | Stucky et al. |
| 5,232,496 A | 8/1993 | Jennings et al. |
| 5,239,799 A | 8/1993 | Bies et al. |
| 5,242,078 A | 9/1993 | Haas et al. |
| 5,250,578 A | 10/1993 | Cornwell |
| 5,305,577 A | 4/1994 | Richards et al. |
| 5,311,381 A | 5/1994 | Lee |
| 5,317,119 A | 5/1994 | Ayres |
| 5,339,522 A | 8/1994 | Paquin et al. |
| 5,344,490 A | 9/1994 | Roosen et al. |
| 5,347,780 A | 9/1994 | Richards et al. |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,395,571 A | 3/1995 | Symons |
| 5,401,588 A | 3/1995 | Garvey et al. |
| 5,417,024 A | 5/1995 | San Paolo |
| 5,433,189 A | 7/1995 | Bales et al. |
| 5,440,843 A | 8/1995 | Langenhorst |
| 5,453,310 A | 9/1995 | Andersen et al. |
| 5,482,551 A * | 1/1996 | Morris .................... C04B 28/14 |
| | | 106/772 |
| 5,505,987 A | 4/1996 | Jennings et al. |
| 5,506,046 A | 4/1996 | Andersen et al. |
| 5,508,072 A | 4/1996 | Andersen et al. |
| 5,514,430 A | 5/1996 | Andersen et al. |
| 5,522,195 A | 6/1996 | Bargen |
| 5,527,387 A | 6/1996 | Andersen et al. |
| 5,540,026 A | 7/1996 | Gartland |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,557,899 A | 9/1996 | Dube et al. |
| 5,569,514 A | 10/1996 | Ayres |
| 5,580,409 A | 12/1996 | Andersen et al. |
| 5,580,624 A | 12/1996 | Andersen et al. |
| 5,582,670 A | 12/1996 | Andersen et al. |
| 5,601,888 A | 2/1997 | Fowler |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,644,870 A | 7/1997 | Chen |
| 5,653,075 A | 8/1997 | Williamson |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,142 A | 2/1998 | Morrison |
| 5,720,913 A * | 2/1998 | Andersen .............. B01F 3/1214 |
| | | 264/108 |
| 5,736,209 A | 4/1998 | Andersen et al. |
| 5,738,921 A | 4/1998 | Andersen et al. |
| 5,740,635 A | 4/1998 | Gil et al. |
| 5,746,822 A | 5/1998 | Espinoza et al. |
| 5,749,178 A | 5/1998 | Garmong |
| 5,753,308 A | 5/1998 | Andersen et al. |
| 5,766,525 A | 6/1998 | Andersen et al. |
| 5,776,388 A | 7/1998 | Andersen et al. |
| 5,782,055 A | 7/1998 | Crittenden |
| 5,783,126 A | 7/1998 | Andersen et al. |
| 5,786,080 A | 7/1998 | Andersen et al. |
| 5,798,010 A | 8/1998 | Richards et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,849,155 A | 12/1998 | Gasland |
| 5,851,634 A | 12/1998 | Andersen et al. |
| 5,868,824 A | 2/1999 | Andersen et al. |
| 5,871,677 A | 2/1999 | Falke et al. |
| 5,879,722 A | 3/1999 | Andersen et al. |
| 5,887,402 A | 3/1999 | Ruggie et al. |
| 5,916,077 A | 6/1999 | Tang |
| 5,928,741 A | 7/1999 | Andersen et al. |
| 5,976,235 A | 11/1999 | Andersen et al. |
| 6,030,673 A | 2/2000 | Andersen et al. |
| 6,067,699 A | 5/2000 | Jackson |
| 6,083,586 A | 7/2000 | Andersen et al. |
| 6,090,195 A | 7/2000 | Andersen et al. |
| 6,115,976 A | 9/2000 | Gomez |
| 6,119,411 A | 9/2000 | Mateu Gill et al. |
| 6,161,363 A | 12/2000 | Herbst |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,231,970 B1 | 5/2001 | Andersen et al. |
| 6,268,022 B1 | 7/2001 | Schlegel et al. |
| 6,299,970 B1 | 10/2001 | Richards et al. |

(56) References Cited

U.S. PATENT DOCUMENTS

| | | |
|---|---|---|
| 6,311,454 B1 | 11/2001 | Kempel |
| 6,327,821 B1 | 12/2001 | Chang |
| 6,347,934 B1 | 2/2002 | Andersen et al. |
| 6,379,446 B1 | 4/2002 | Andersen et al. |
| 6,402,830 B1 | 6/2002 | Schaffer |
| 6,434,899 B1 | 8/2002 | Fortin et al. |
| 6,475,275 B1 | 11/2002 | Nebesnak et al. |
| 6,485,561 B1 | 11/2002 | Dattel |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,773,500 B1 | 8/2004 | Creamer et al. |
| 6,779,859 B2 | 8/2004 | Koons |
| 6,818,055 B2 | 11/2004 | Schelinski |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |
| 6,964,722 B2 | 11/2005 | Taylor et al. |
| 6,981,351 B2 | 1/2006 | Degelsegger |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,758,955 B2 | 7/2010 | Frey et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 7,927,420 B2 | 4/2011 | Francis |
| 7,964,051 B2 | 6/2011 | Lynch et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 8,915,033 B2 | 12/2014 | Daniels |
| 9,027,296 B2 | 5/2015 | Daniels |
| 9,475,732 B2 | 10/2016 | Daniels |
| 9,890,083 B2 | 2/2018 | Daniels |
| 2001/0032367 A1 | 10/2001 | Sasage et al. |
| 2001/0047741 A1 | 12/2001 | Gleeson et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Soane et al. |
| 2002/0166479 A1 | 11/2002 | Jiang |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0025465 A1 | 2/2004 | Aldea |
| 2004/0026002 A1 | 2/2004 | Weldon |
| 2004/0231285 A1 | 11/2004 | Hunt et al. |
| 2004/0258901 A1 | 12/2004 | Luckevich |
| 2005/0092237 A1 | 5/2005 | Daniels |
| 2005/0227006 A1 | 10/2005 | Segall |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0168906 A1 | 8/2006 | Tonyan et al. |
| 2006/0287773 A1 | 12/2006 | Andersen et al. |
| 2007/0021515 A1 | 1/2007 | Glenn et al. |
| 2007/0077436 A1 | 4/2007 | Naji et al. |
| 2007/0092712 A1 | 4/2007 | Hodson |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2007/0283660 A1 | 12/2007 | Blahut |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1 | 2/2008 | Lynch et al. |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0152945 A1 | 6/2008 | Miller |
| 2008/0156225 A1 | 7/2008 | Bury |
| 2008/0286519 A1 | 11/2008 | Nicolson et al. |
| 2009/0011207 A1 | 1/2009 | Dubey |
| 2009/0151602 A1 | 6/2009 | Francis |
| 2009/0197991 A1 | 8/2009 | Bury |
| 2009/0266804 A1 | 10/2009 | Costin et al. |
| 2010/0064943 A1 | 3/2010 | Guevara et al. |
| 2010/0071597 A1 | 3/2010 | Perez-Pena |
| 2010/0095622 A1 | 4/2010 | Niemoller |
| 2010/0136269 A1* | 6/2010 | Andersen .............. B28B 3/26 428/34.4 |
| 2010/0251632 A1 | 10/2010 | Chen et al. |
| 2010/0252946 A1 | 10/2010 | Stumm |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0276310 A1 | 1/2012 | Andersen et al. |
| 2012/0164402 A1 | 6/2012 | Murakami |
| 2012/0208003 A1 | 8/2012 | Beard |
| 2013/0008115 A1 | 1/2013 | Bierman |
| 2013/0086858 A1 | 4/2013 | Daniels et al. |
| 2013/0216802 A1 | 8/2013 | Leung et al. |
| 2013/0280518 A1 | 10/2013 | Stahl et al. |
| 2014/0000193 A1 | 1/2014 | Daniels et al. |
| 2014/0000194 A1 | 1/2014 | Daniels et al. |
| 2014/0000195 A1 | 1/2014 | Daniels et al. |
| 2014/0000196 A1 | 1/2014 | Daniels et al. |
| 2015/0086769 A1 | 3/2015 | Daniels et al. |
| 2015/0107172 A1 | 4/2015 | Daniels et al. |

FOREIGN PATENT DOCUMENTS

| | | |
|---|---|---|
| CN | 101132999 A | 2/2008 |
| CN | 101239838 | 8/2008 |
| CN | 102001832 A | 11/2010 |
| CN | 102167619 A | 8/2011 |
| CN | 102220829 A | 10/2011 |
| CN | 102643013 A | 8/2012 |
| CN | 102712531 A | 10/2012 |
| DE | 102006015644 A1 | 10/2007 |
| EP | 1266877 A2 | 12/2002 |
| EP | 2189612 A2 | 5/2010 |

(56) References Cited

FOREIGN PATENT DOCUMENTS

| | | |
|---|---|---|
| EP | 2230075 A1 | 9/2010 |
| EP | 2314462 A1 | 4/2011 |
| EP | 2583954 A1 | 4/2013 |
| GB | 1265471 A | 3/1972 |
| GB | 1508866 | 4/1978 |
| JP | H05-052075 A | 3/1993 |
| JP | H05-097487 | 4/1993 |
| JP | H06-56497 A | 3/1994 |
| JP | 08-150211 A | 6/1996 |
| JP | H11-147777 | 6/1999 |
| JP | 2004332401 A | 11/2004 |
| JP | 2008036549 A | 2/2008 |
| JP | 2008201613 | 9/2008 |
| KR | 20080005426 A | 1/2008 |
| RU | 2132829 C1 | 7/1999 |
| RU | 2411218 C1 | 2/2011 |
| WO | 199105744 A1 | 5/1991 |
| WO | 2002031306 A1 | 4/2002 |
| WO | 2003004432 A1 | 1/2003 |
| WO | 2005105700 A1 | 11/2005 |
| WO | 2006138732 A2 | 12/2006 |
| WO | 2007051093 | 5/2007 |
| WO | 2007053852 | 5/2007 |
| WO | 2008144186 A1 | 11/2008 |
| WO | 2009038621 A1 | 3/2009 |
| WO | 2010141032 A1 | 12/2010 |
| WO | 2011066192 A1 | 6/2011 |
| WO | 2012084716 A1 | 6/2012 |
| WO | 2013082524 A1 | 6/2013 |

OTHER PUBLICATIONS

International Search Report for PCT/US2013/048642 dated Sep. 2, 2013.
International Search Report for PCT/US2013/048712 dated Sep. 10, 2013.
International Search Report for PCT/US2014/035277 dated Sep. 2, 2014.
International Search Report for PCT/US2014/035313 dated Aug. 19, 2014.
Kralj, D., "Experimental study of recycling lightweight concrete with aggregates containing expanded glass." Process Safety and Environmental Protection, vol. 87, No. 4, Jul. 1, 2809 (Jul. 1, 2009), pp. 267-273.
Supplemental European Search Report for EP 15803724 dated Jan. 23, 2018.
XP 000375896 6001 Chemical Abstracts 117 Aug. 24, 1992, No. 8, Columbus, Ohio, US.
Office Action, EP 15746011.4 dated Mar. 2, 2020.

* cited by examiner

CEMENT-BASED TILE

PRIORITY CLAIM AND CROSS-REFERENCE TO RELATED APPLICATIONS

This application claims priority to, and is a continuation-in-part application of U.S. patent application Ser. No. 15/315,536 filed on Dec. 1, 2016, which is a National Stage Application of International Application No. PCT/US2015/034397 filed on Jun. 5, 2015, which claims priority to U.S. Provisional Patent Application Ser. No. 62/007,984, filed on Jun. 5, 2014. The contents of the foregoing applications are hereby incorporated by reference herein in their entirety.

FIELD OF THE INVENTION

The present invention relates generally to the field of building materials and, more particularly, to cement-based tiles.

STATEMENT OF FEDERALLY FUNDED RESEARCH

None.

BACKGROUND OF THE INVENTION

Cement-based tiles, such as roofing tiles, are generally heavy and require special installation, such as increased structural support and fasteners or pre-drilled installation holes.

Typically, concrete roofing tiles are produced by mixing cement and sand with 6-10% water (zero-slump material), and dropping a metered amount of the mixture into a mold (with the back side pattern) and passing it under a roller that compresses the mixture and forms the top surface. Sometimes the industry will call this process "extrusion" because of the continuous process of passing it under a stationary roller, but it does not use an extruder.

Typically, ceramic tiles (terra-cotta, porcelain, etc.) are made by extruding a clay-type material through an extruder or a pug mill that will form a continuous cylindrical string of material from which blanks/disks are cut that drop into a mold sitting on a rotating table that rotates each mold into position to be pressed into a tile (revolver press).

SUMMARY OF THE INVENTION

In one embodiment, a cement-based tile formed from a mixture comprises: a cement in the range of about 0.1 to 88% by wet weight percent; a secondary material in the range of about 0.1 to 50% by wet weight percent, the secondary material comprising limestone, sand, silica sand, gypsum, silica fume, fumed silica, Plaster of Paris, calcium carbonate, fly ash, slag, rock, or a combination thereof a reinforcement fiber in the range of about 0.5 to 20% by wet weight percent, the reinforcement fiber comprising cellulose fiber, glass fiber, plastic fiber, polypropylene fiber, polyvinyl alcohol (PVA) fiber, homopolymer acrylic fiber, alkali-resistant fiber, or a combination thereof a rheology modifying agent in the range of about 0.5 to 10% by wet weight percent; a water in the range of 10 to 60% of a total wet material weight; and wherein the mixture is extruded or molded to form the cement-based tile.

In one aspect, the cement contains gypsum. In another aspect, the mixture further comprises a color pigment in the range of about 0.1 to 5% by wet weight percent. In another aspect, the mixture further comprises a retarder in the range of 0.1 to 8% by wet weight percent. In another aspect, the retarder comprising sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) or hydroxypropoylmethylcelluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm$^3$, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile.

In another embodiment, the cement is in the range of about 40 to 55% by wet weight percent; the secondary material is in the range of about 20 to 40% by wet weight percent; the reinforcement fiber is in the range of about 1 to 5% by wet weight percent; the rheology modifying agent is in the range of about 0.5 to 2.5 by wet weight percent; and the water in the range of 15 to 25% of the total wet material weight.

In another embodiment, the cement is in the range of about 45 to 50% by wet weight percent; the secondary material is in the range of about 28 to 30% by wet weight percent; the reinforcement fiber is in the range of about 1.9 to 2.1% by wet weight percent; the rheology modifying agent is in the range of about 1.5 to 1.7 by wet weight percent; and the water in the range of 18 to 20% of the total wet material weight.

In another embodiment, a cement-based tile formed from a mixture consisting essentially of: a cement in the range of about 0.1 to 88% by wet weight percent; a secondary material in the range of about 0.1 to 50% by wet weight percent, the secondary material comprising limestone, sand, silica sand, gypsum, silica fume, fumed silica, Plaster of Paris, calcium carbonate, fly ash, slag, rock, or a combination thereof; a reinforcement fiber in the range of about 0.5 to 20% by wet weight percent, the reinforcement fiber comprising cellulose fiber, glass fiber, plastic fiber, polypropylene fiber, polyvinyl alcohol (PVA) fiber, homopolymer acrylic fiber, alkali-resistant fiber, or a combination thereof; a rheology modifying agent in the range of about 0.5 to 10% by wet weight percent; a water in the range of 10 to 60% of a total wet material weight; and wherein the mixture is extruded or molded to form the cement-based tile.

In another embodiment, a method for manufacturing a cement-based tile comprises: mixing a cement in the range of about 0.1 to 88% by wet weight percent, a secondary material in the range of about 0.1 to 50% by wet weight percent, a reinforcement fiber in the range of about 0.5 to 20% by wet weight percent, and a rheology modifying agent in the range of about 0.5 to 10% by wet weight percent with a water in the range of 10 to 60% of a total wet material weight at a same time, wherein the secondary material comprises limestone, sand, silica sand, gypsum, silica fume, fumed silica, Plaster of Paris, calcium carbonate, fly ash, slag, rock, or a combination thereof, and the reinforcement fiber comprises cellulose fiber, glass fiber, plastic fiber, polypropylene fiber, polyvinyl alcohol (PVA) fiber, homopolymer acrylic fiber, alkali-resistant fiber, or a combination thereof extruding the mixture through a die using an extruder or molding the mixture using one or more molds; and allowing the extruded or molded mixture to set.

In another aspect, the cement contains gypsum. In another aspect, the mixing further comprises a color pigment in the range of about 0.1 to 5% by wet weight percent. In another aspect, the mixing further comprises a retarder in the range of 0.1 to 8% by wet weight percent. In another aspect, the retarder comprises sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) or hydroxypropoylmethylcelluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm$^3$, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile. In another aspect, the cement is in the range of about 40 to 55% by wet weight percent; the secondary material is in the range of about 20 to 40% by wet weight percent; the reinforcement fiber is in the range of about 1 to 5% by wet weight percent; the rheology modifying agent is in the range of about 0.5 to 2.5 by wet weight percent; and the water in the range of 15 to 25% of the total wet material weight. In another aspect, the cement is in the range of about 45 to 50% by wet weight percent; the secondary material is in the range of about 28 to 30% by wet weight percent; the reinforcement fiber is in the range of about 1.9 to 2.1% by wet weight percent; the rheology modifying agent is in the range of about 1.5 to 1.7 by wet weight percent; and the water in the range of 18 to 20% of the total wet material weight. In another aspect, extruding the mixture through the die using the extruder comprises: conveying the mixture through a barrel using an auger; and continuously forming the mixture into a final shape having form stability through the die using the extruder. In another aspect, the extruded mixture comprises an elongated sheet and further comprising rolling the elongated sheet through one or more sets of calenders. In another aspect, the method further comprises: cutting the elongated sheet into a set of individual sheets having a specified length; stacking the set of individual sheets onto a pallet; covering the stack with a plastic and an insulating material; curing the stack by allowing the covered stack to sit for a specified time period; and squaring up and sanding each individual sheet. In another aspect, the specified time period is approximately 24 to 48 hours. In another aspect, the extruded mixture or the molded mixture is allowed to set for up to 2 to 3 hours. In another aspect, the method further comprises curing the extruded mixture or the molded mixture. In another aspect, the method further comprises drying the extruded mixture or the molded mixture. In another aspect, the method further comprises cutting, trimming, sanding or routing the extruded mixture or the molded mixture into a specified shape. In another aspect, the method further comprises spraying the extruded mixture or the molded mixture with a water repellent. In another aspect, the method further comprises applying one or more coatings or inks to extruded mixture or the molded mixture. In another aspect, the one or more coatings or inks comprise a UV coating, a fire resistant coating, a color, an image, a texture or a combination thereof.

In another embodiment, a method for manufacturing a cement-based tile comprises: mixing a cement in the range of about 0.1 to 88% by wet weight percent with a water in the range of 10 to 60% of a total wet material weight; blending the cement-water mixture with a secondary material in the range of about 0.1 to 50% by wet weight percent and a reinforcement fiber in the range of about 0.5 to 20% by wet weight percent, wherein the secondary material comprises limestone, sand, silica sand, gypsum, silica fume, fumed silica, Plaster of Paris, calcium carbonate, fly ash, slag, rock, or a combination thereof, and the reinforcement fiber comprises cellulose fiber, glass fiber, plastic fiber, polypropylene fiber, polyvinyl alcohol (PVA) fiber, homopolymer acrylic fiber, alkali-resistant fiber, or a combination thereof; adding a rheology modifying agent in the range of about 0.5 to 10% by wet weight percent; extruding the mixture through a die using an extruder or molding the mixture using one or more molds; and allowing the extruded or molded mixture to set.

In another aspect, the cement contains gypsum. In another aspect, the method further comprises adding a color pigment in the range of about 0.1 to 5% by wet weight percent. In another aspect, the method further comprises adding a retarder in the range of 0.1 to 8% by wet weight percent. In another aspect, the retarder comprises sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) or hydroxypropoylmethylcelluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm³, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile. In another aspect, the cement is in the range of about 40 to 55% by wet weight percent; the secondary material is in the range of about 20 to 40% by wet weight percent; the reinforcement fiber is in the range of about 1 to 5% by wet weight percent; the rheology modifying agent is in the range of about 0.5 to 2.5 by wet weight percent; and the water in the range of 15 to 25% of the total wet material weight. In another aspect, the cement is in the range of about 45 to 50% by wet weight percent; the secondary material is in the range of about 28 to 30% by wet weight percent; the reinforcement fiber is in the range of about 1.9 to 2.1% by wet weight percent; the rheology modifying agent is in the range of about 1.5 to 1.7 by wet weight percent; and the water in the range of 18 to 20% of the total wet material weight. In another aspect, extruding the mixture through the die using the extruder comprises: conveying the mixture through a barrel using an auger; and continuously forming the mixture into a final shape having form stability through the die using the extruder. In another aspect, the extruded mixture comprises an elongated sheet and further comprising rolling the elongated sheet through one or more sets of calenders. In another aspect, the method further comprises: cutting the elongated sheet into a set of individual sheets having a specified length; stacking the set of individual sheets onto a pallet; covering the stack with a plastic and an insulating material; curing the stack by allowing the covered stack to sit for a specified time period; and squaring up and sanding each individual sheet. In another aspect, the specified time period is approximately 24 to 48 hours. In another aspect, the extruded mixture or the molded mixture is allowed to set for up to 2 to 3 hours. In another aspect, the method further comprises curing the extruded mixture or the molded mixture. In another aspect, the method further comprises drying the extruded mixture or the molded mixture. In another aspect, the method further comprises cutting, trimming, sanding or routing the extruded mixture or the molded mixture into a specified shape. In another aspect, the method further comprises spraying the extruded mixture or the molded mixture with a water repellent. In another aspect, the method further comprises applying one or more coatings or inks to extruded mixture or the molded mixture. In another aspect, the one or more coatings or inks comprise a UV coating, a fire resistant coating, a color, an image, a texture or a combination thereof.

BRIEF DESCRIPTION OF THE DRAWINGS

The above and further advantages of the invention may be better understood by referring to the following description in conjunction with the accompanying drawings, in which:
None.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. In some embodiments, the cement-based tile can a roofing tile, a wall tile, a floor tile or any other type of tile. The compositions and methods described herein are also be applicable to other cement-based materials that are not tiles.

Ordinary Portland cement (OPC), calcium aluminate cement (CAC), Sorel cement (magnesium oxide and magnesium chloride cements), CSA cement (calcium sulphate aluminate cement), phosphate cement or other cement type known in the State-of-the-Art, in its wet state with water added before setting, can be rheologically modified into a clay-like material, which allows the use of the conventional clay production method known as extrusion.

The cement can be used as a binder with water in a composite composition in combination with a multitude of materials, such as, one or more secondary materials and one or more reinforcement fibers, which when rheologically modified can be molded or extruded. The secondary material can be, but is not limited to, fine limestone, sand, silica sand, gypsum, silica fume, fumed silica, Plaster of Paris, calcium carbonate, fly ash, slag, rock, or a combination thereof. The preferred secondary material for roofing tiles is calcium carbonate or silica sand. Note that the cement may contain small amounts of gypsum (e.g., 0.1% to 4%, etc.), so adding gypsum as a secondary material to the mixture may not be necessary when the desired gypsum content is in this range. The reinforcement fiber can be, but is not limited to, cellulose fiber, glass fiber, plastic fiber, polypropylene fiber, polyvinyl alcohol (PVA) fiber, Dolanit® fiber (generic name: homopolymer acrylic or alkali-resistant fiber), or a combination thereof. The preferred reinforcement fiber for roofing tiles is PVA fiber.

The cement-water mixture is stabilized by the addition of a rheology modifying agent typically in an amount of about 0.5 to 10% Wt. wet.

The rheology-modifying agents fall into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc.

Suitable starch based materials include, for example, wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, and dialdehyde starches.

The currently preferred rheology-modifying agent is hydroxypropylmethylcellulose, examples of which are Methocel 240 and Methocel 240S.

For extrusion, the cement-based composite with approx. 10-60 Wt. % water of the total wet material and a suitable rheology modifying admixture is made to feel and behave similar to plastic clay. The material feels plastic/deformable to the touch and can be extruded similar to clay with the use of a clay extruder where the material is conveyed forward by an auger through a barrel and is formed continuously through a die into a final shape with form stability.

Depending on the water content and the amount of rheology modifying admixture, the extruded material can have more or less form stability.

By adding a reinforcement fiber to the material increased stability will be achieved before setting of the cement. Further, the fiber addition has been found to reduce or eliminate material shrinkage and drying shrinkage cracks during the drying phase of the production process, and further provide increased flexural strength and toughness of the dry material. As stated above, the preferred type of reinforcement fiber for roofing tiles is PVA fiber. In other embodiments, the reinforcement fiber is cellulose (hardwood or softwood), plastic (based on polyvinyl alcohol or acrylic) and glass fiber. Cellulose and plastic fiber is primarily used for insulation intended for below freezing or ambient temperatures, whereas glass fiber is primarily used for insulation intended for temperatures above ambient or where fire resistance is required. Also, combinations of fiber types can be applied. The preferred fiber length is from about 1 to 2 mm for the cellulose fiber, about 4 to 10 mm for the plastic fiber and about 6 to 20 mm for the glass fiber. The preferred fiber diameter is about 10 to 40 microns.

To increase the time that the cement-based material can be extruded before setting (hardening), the setting time can be retarded up to several hours with the use of small additions of suitable conventional concrete set retarder (e.g., Delvo® from the company BASF). The cement-based material can be extruded by conveying the mixture through a barrel using an auger, and continuously forming the mixture into a final shape having form stability through the die using the extruder. Following extrusion, the material will within a few hours develop the initial and final setting of the finished product.

To develop the final 28 days strength of products made from OPC cement, the product is either allowed to sit around for 28 days in a humid environment, or the strength development can be accelerated within 24-48 hours by heating either by its own internal (exothermic) heat development or by steam curing such as is conventional in the State-of-the-Art.

Products made from CAC cement, Sorel cement, CSA cement, phosphate cement or other cement types will achieve its final strength in 24 hours and does not necessarily require additional curing.

After achieving the final strength development, the product is dried to generate the finished composite material. Following hardening, the hardened material can be finished as desired (e.g., cut to size, sanded, trimmed, painted, sealed, textured, imaged, etc.).

In one embodiment, the finished product can be made water repellent by spraying the product with water or solvent based silane. Such product, Protectosil BHN, is typically sold by BASF. The finished product can also be sprayed with anti-fungal or anti-microbial coatings. Moreover, the finished product can be painted, stained or textured.

The finished lightweight cement-based composite will have a density in the range of about 1.4 to 2.4 g/cm$^3$, a compressive strength in the range of about 5 to 100 MPa, and a flexural strength in the range of about 5 to 35 MPa.

The compositional ranges are shown below:

| Component | Material Wt. % Range of Wet |
|---|---|
| Cement (may include some gypsum) | 0.1 to 88 |
| Water | 10 to 60 |
| Secondary Material (e.g., limestone, sand, silica sand, gypsum, silica fume, fumed silica, Plaster of Paris, calcium carbonate, fly ash, slag, rock, or a combination thereof, etc.) | 0.1 to 50 |
| Reinforcement Fiber (e.g., cellulose fiber, glass fiber, plastic fiber, polypropylene fiber, polyvinyl alcohol (PVA) fiber, homopolymer acrylic fiber, alkali-resistant fiber, or a combination thereof, etc.) | 0.5 to 20 |
| Rheology-Modifying Agent | 0.5 to 10 |
| Retarder (optional) (e.g., sodium citrate, a mixture of Plaster of Paris, sodium citrate and crystalline silica, etc.) | 0 to 8 |
| Color Pigment (optional) | 0 to 5 |

The cement can be 0.1%, 0.2%, 0.3%, 0.4%, 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, or 88% by weight or other incremental percentage between.

The water can be 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

The secondary material can be 0.1%, 0.2%, 0.3%, 0.4%, 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

The reinforcement fiber can be 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19%, or 20% by weight or other incremental percentage between.

The rheology modifying agent can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9% or 10% by weight or other incremental percentage between.

The retarder can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, or 8.0% by weight or other incremental percentage between.

The color pigment can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5.0% by weight or other incremental percentage between.

As a result, in one embodiment, a cement-based tile formed from a mixture comprises: a cement in the range of about 0.1 to 88% by wet weight percent; a secondary material in the range of about 0.1 to 50% by wet weight percent, the secondary material comprising limestone, sand, silica sand, gypsum, silica fume, fumed silica, Plaster of Paris, calcium carbonate, fly ash, slag, rock, or a combination thereof; a reinforcement fiber in the range of about 0.5 to 20% by wet weight percent, the reinforcement fiber comprising cellulose fiber, glass fiber, plastic fiber, polypropylene fiber, polyvinyl alcohol (PVA) fiber, homopolymer acrylic fiber, alkali-resistant fiber, or a combination thereof; a rheology modifying agent in the range of about 0.5 to 10% by wet weight percent; a water in the range of 10 to 60% of a total wet material weight; and wherein the mixture is extruded or molded to form the cement-based tile.

In one aspect, the cement contains gypsum. In another aspect, the mixture further comprises a color pigment in the range of about 0.1 to 5% by wet weight percent. In another aspect, the mixture further comprises a retarder in the range of 0.1 to 8% by wet weight percent. In another aspect, the retarder comprising sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) or hydroxypropoylmethylcelluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm$^3$, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile.

In another embodiment, a cement-based tile formed from a mixture consisting essentially of: a cement in the range of about 0.1 to 88% by wet weight percent; a secondary material in the range of about 0.1 to 50% by wet weight percent, the secondary material comprising limestone, sand, silica sand, gypsum, silica fume, fumed silica, Plaster of Paris, calcium carbonate, fly ash, slag, rock, or a combination thereof a reinforcement fiber in the range of about 0.5 to 20% by wet weight percent, the reinforcement fiber comprising cellulose fiber, glass fiber, plastic fiber, polypropylene fiber, polyvinyl alcohol (PVA) fiber, homopolymer acrylic fiber, alkali-resistant fiber, or a combination thereof; a rheology modifying agent in the range of about 0.5 to 10% by wet weight percent; a water in the range of 10 to 60% of a total wet material weight; and wherein the mixture is extruded or molded to form the cement-based tile.

In another embodiment, the compositional ranges are shown below:

| Material | |
| --- | --- |
| Component | Wt. % Range of Wet |
| Cement (may include some gypsum) | 40 to 55 |
| Water | 15 to 25 |
| Secondary Material (e.g., limestone, sand, silica sand, gypsum, silica fume, fumed silica, Plaster of Paris, calcium carbonate, fly ash, slag, rock, or a combination thereof, etc.) | 20 to 40 |
| Reinforcement Fiber (e.g., cellulose fiber, glass fiber, plastic fiber, polypropylene fiber, polyvinyl alcohol (PVA) fiber, homopolymer acrylic fiber, alkali-resistant fiber, or a combination thereof, etc.) | 1 to 5 |
| Rheology-Modifying Agent | 0.5 to 2.5 |
| Retarder (optional) (e.g., sodium citrate, a mixture of Plaster of Paris, sodium citrate and crystalline silica, etc.) | 0 to 8 |
| Color Pigment (optional) | 0 to 5 |

The cement can be 40%, 41%, 42%, 43%, 44%, 45%, 46%, 47%, 48%, 49%, 50%, 51%, 52%, 53%, 54%, or 55% by weight or other incremental percentage between.

The water can be 15%, 16%, 17%, 18%, 19%, 20%, 21%, 22%, 23%, 24%, or 25% by weight or other incremental percentage between.

The secondary material can be 20%, 21%, 22%, 23%, 24%, 25%, 26%, 27%, 28%, 29%, 30%, 31%, 32%, 33%, 34%, 35%, 36%, 37%, 38%, 39%, or 40% by weight or other incremental percentage between.

The reinforcement fiber can be 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5% by weight or other incremental percentage between.

The rheology modifying agent can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5% by weight or other incremental percentage between.

The retarder can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, or 8.0% by weight or other incremental percentage between.

The color pigment can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5.0% by weight or other incremental percentage between.

As a result, in this embodiment, a cement-based tile formed from a mixture comprises: a cement in the range of about 40 to 55% by wet weight percent; a secondary material in the range of about 20 to 40% by wet weight percent, the secondary material comprising limestone, sand, silica sand, gypsum, silica fume, fumed silica, Plaster of Paris, calcium carbonate, fly ash, slag, rock, or a combination thereof; a reinforcement fiber in the range of about 1 to 5% by wet weight percent, the reinforcement fiber comprising cellulose fiber, glass fiber, plastic fiber, polypropylene fiber, polyvinyl alcohol (PVA) fiber, homopolymer acrylic fiber, alkali-resistant fiber, or a combination thereof a rheology modifying agent in the range of about 0.5 to 2.5 by wet weight percent; and the water in the range of 15 to 25% of the total wet material weight; and wherein the mixture is extruded or molded to form the cement-based tile.

In one aspect, the cement contains gypsum. In another aspect, the mixture further comprises a color pigment in the range of about 0.1 to 5% by wet weight percent. In another aspect, the mixture further comprises a retarder in the range of 0.1 to 8% by wet weight percent. In another aspect, the retarder comprising sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) or hydroxypropoylmethylcelluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm$^3$, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile.

In yet another embodiment, the compositional ranges are shown below:

| Component | Material Wt. % Range of Wet |
|---|---|
| Cement (may include some gypsum) | 45 to 50 |
| Water | 18 to 20 |
| Secondary Material (e.g., limestone, sand, silica sand, gypsum, silica fume, fumed silica, Plaster of Paris, calcium carbonate, fly ash, slag, rock, or a combination thereof, etc.) | 28 to 31 |
| Reinforcement Fiber (e.g., cellulose fiber, glass fiber, plastic fiber, polypropylene fiber, polyvinyl alcohol (PVA) fiber, homopolymer acrylic fiber, alkali-resistant fiber fiber, or a combination thereof, etc.) | 1.9 to 2.1 |
| Rheology-Modifying Agent | 1.5 to 1.7 |
| Retarder (optional) (e.g., sodium citrate, a mixture of Plaster of Paris, sodium citrate and crystalline silica, etc.) | 0 to 8 |
| Color Pigment (optional) | 0 to 5 |

The cement can be 45.0%, 45.1%, 45.2%, 45.3%, 45.4%, 45.5%, 45.6%, 45.7%, 45.8%, 45.9%, 46.0%, 46.1%, 46.2%, 46.3%, 46.4%, 46.5%, 46.6%, 46.7%, 46.8%, 46.9%, 47.0%, 47.1%, 47.2%, 47.3%, 47.4%, 47.5%, 47.6%, 47.7%, 47.8%, 47.9%, 48.0%, 48.1%, 48.2%, 48.3%, 48.4%, 48.5%, 48.6%, 48.7%, 48.8%, 48.9%, 49.0%, 49.1%, 49.2%, 49.3%, 49.4%, 49.5%, 49.6%, 49.7%, 49.8%, 49.9%, or 50.0% by weight or other incremental percentage between.

The water can be 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, or 20.0% by weight or other incremental percentage between.

The secondary material can be 28.0%, 28.1%, 28.2%, 28.3%, 28.4%, 28.5%, 28.6%, 28.7%, 28.8%, 28.9%, 29.0%, 29.1%, 29.2%, 29.3%, 29.4%, 29.5%, 29.6%, 29.7%, 29.8%, 29.9%, 30.0%, 30.1%, 30.2%, 30.3%, 30.4%, 30.5%, 30.6%, 30.7%, 30.8%, 30.9%, or 31% by weight or other incremental percentage between.

The reinforcement fiber can be 1.9%, 2.0%, or 2.1% by weight or other incremental percentage between.

The rheology modifying agent can be 1.5%, 1.6%, or 1.7% by weight or other incremental percentage between.

The retarder can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, or 8.0% A by weight or other incremental percentage between.

The color pigment can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5.0% A by weight or other incremental percentage between.

As a result, in this embodiment, a cement-based tile formed from a mixture comprises: a cement in the range of about 45 to 50% A by wet weight percent; a secondary material in the range of about 28 to 30% A by wet weight percent, the secondary material comprising limestone, sand, silica sand, gypsum, silica fume, fumed silica, Plaster of Paris, calcium carbonate, fly ash, slag, rock, or a combination thereof; a reinforcement fiber in the range of about 1.9 to 2.1% by wet weight percent, the reinforcement fiber comprising cellulose fiber, glass fiber, plastic fiber, polypropylene fiber, polyvinyl alcohol (PVA) fiber, homopolymer acrylic fiber, alkali-resistant fiber, or a combination thereof; a rheology modifying agent in the range of about 1.5 to 1.7 by wet weight percent; and a water in the range of 18 to 20% of the total wet material weight; and wherein the mixture is extruded or molded to form the cement-based tile.

In one aspect, the cement contains gypsum. In another aspect, the mixture further comprises a color pigment in the range of about 0.1 to 5% by wet weight percent. In another aspect, the mixture further comprises a retarder in the range of 0.1 to 8% by wet weight percent. In another aspect, the retarder comprising sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) or hydroxypropoylmethylcelluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm$^3$, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile.

The cement-based tiles can be produced in a number of ways, which include, but are not limited to:

1) Extrusion with a clay extruder through a die into the final shape of the roofing tiles.

2) Extrusion with a clay extruder through a die into a sheet of thickness equal to or bigger than the final thickness of the tiles and a width that allows for the width of one or multiple tiles. The sheet is formed into the shape of the final tiles either by placing the sheet over a bottom mold half in a vertical press or running the sheet through forming calenders.

3) Extruding cylindrical pieces of material that are subsequently formed into the final tile shape between bottom and top molds in a vertical press or similar.

4) By mixing the rheologically modified material and placing finite metered pieces of the material that are subsequently formed into the final tile shape between bottom and top molds in a vertical press or similar.

Following setting within a couple of hours, the roofing tiles are dried in an oven. Typically the roofing tiles will have a thickness range of 5 mm to 40 mm.

The mechanical properties are modified to generate a ductile (non-brittle) material by the addition of fiber reinforcement such as cellulose fiber, glass fiber, plastic fiber, polypropylene fiber, polyvinyl alcohol (PVA) fiber, Dolanit® fiber (generic name: homopolymer acrylic or alkali-resistant fiber), or similar, or combination thereof.

The cement-based tiles can be made water resistant by treating the surface of the product to a water repellent silane or water resistant surface coating known in state-of-the-art. Freeze-Thaw resistance can be accomplished by incorporating micro-balloons in the composite composition.

Compared to state-of-the-art roofing tiles, the roofing tiles of the present invention are lighter, thinner, more ductile, more durable and less costly. In fact, the roofing tiles do not require additional structural support. Moreover, the roofing tiles can be installed using traditional equipment and nails without predrilled holes or special fasteners.

In another embodiment, a method for manufacturing a cement-based tile comprises: mixing a cement in the range of about 0.1 to 88% by wet weight percent, a secondary material in the range of about 0.1 to 50% by wet weight percent, a reinforcement fiber in the range of about 0.5 to 20% by wet weight percent, and a rheology modifying agent in the range of about 0.5 to 10% by wet weight percent with a water in the range of 10 to 60% of a total wet material weight at a same time, wherein the secondary material comprises limestone, sand, silica sand, gypsum, silica fume, fumed silica, Plaster of Paris, calcium carbonate, fly ash, slag, rock, or a combination thereof, and the reinforcement fiber comprises cellulose fiber, glass fiber, plastic fiber, polypropylene fiber, polyvinyl alcohol (PVA) fiber, homopolymer acrylic fiber, alkali-resistant fiber, or a combination thereof extruding the mixture through a die using an extruder or molding the mixture using one or more molds; and allowing the extruded or molded mixture to set.

In another aspect, the cement contains gypsum. In another aspect, the mixing further comprises a color pigment in the range of about 0.1 to 5% by wet weight percent. In another aspect, the mixing further comprises a retarder in the range of 0.1 to 8% by wet weight percent. In another aspect, the retarder comprises sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethyl ethyl cellulose (HMEC), carboxymethylcellulose (CMC), methylcellulose (MC), ethylcellulose (EC), hydroxyethylcellulose (HEC), hydroxyethylpropylcellulose (HEPC) or hydroxypropoylmethylcelluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm$^3$, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile. In another aspect, the cement is in the range of about 40 to 55% by wet weight percent; the secondary material is in the range of about 20 to 40% by wet weight percent; the reinforcement fiber is in the range of about 1 to 5% by wet weight percent; the rheology modifying agent is in the range of about 0.5 to 2.5 by wet weight percent; and the water in the range of 15 to 25% of the total wet material weight. In another aspect, the cement is in the range of about 45 to 50% by wet weight percent; the secondary material is in the range of about 28 to 30% by wet weight percent; the reinforcement fiber is in the range of about 1.9 to 2.1% by wet weight percent; the rheology modifying agent is in the range of about 1.5 to 1.7 by wet weight percent; and the water in the range of 18 to 20% of the total wet material weight. In another aspect, extruding the mixture through the die using the extruder comprises: conveying the mixture through a barrel using an auger; and continuously forming the mixture into a final shape having form stability through the die using the extruder. In another aspect, the extruded mixture comprises an elongated sheet and further comprising rolling the elongated sheet through one or more sets of calenders. In another aspect, the method further comprises: cutting the elongated sheet into a set of individual sheets having a specified length; stacking the set of individual sheets onto a pallet; covering the stack with a plastic and an insulating material; curing the stack by allowing the covered stack to sit for a specified time period; and squaring up and sanding each individual sheet. In another aspect, the specified time period is approximately 24 to 48 hours. In another aspect, the extruded mixture or the molded mixture is allowed to set for up to 2 to 3 hours. In another aspect, the method further comprises curing the extruded mixture or the molded mixture. In another aspect, the method further comprises drying the extruded mixture or the molded mixture. In another aspect, the method further comprises cutting, trimming, sanding or routing the extruded mixture or the molded mixture into a specified shape. In another aspect, the method further comprises spraying the extruded mixture or the molded mixture with a water repellent. In another aspect, the method further comprises applying one or more coatings or inks to extruded mixture or the molded mixture. In another aspect, the one or more coatings or inks comprise a UV coating, a fire resistant coating, a color, an image, a texture or a combination thereof.

In another embodiment, a method for manufacturing a cement-based tile comprises: mixing a cement in the range of about 0.1 to 88% by wet weight percent with a water in the range of 10 to 60% of a total wet material weight; blending the cement-water mixture with a secondary material in the range of about 0.1 to 50% by wet weight percent and a reinforcement fiber in the range of about 0.5 to 20% by wet weight percent, wherein the secondary material comprises limestone, sand, silica sand, gypsum, silica fume, fumed silica, Plaster of Paris, calcium carbonate, fly ash, slag, rock, or a combination thereof, and the reinforcement fiber comprises cellulose fiber, glass fiber, plastic fiber, polypropylene fiber, polyvinyl alcohol (PVA) fiber, homopolymer acrylic fiber, alkali-resistant fiber, or a combination thereof; adding a rheology modifying agent in the range of about 0.5 to 10% by wet weight percent; extruding the mixture through a die using an extruder or molding the mixture using one or more molds; and allowing the extruded or molded mixture to set.

In another aspect, the cement contains gypsum. In another aspect, the method further comprises adding a color pigment in the range of about 0.1 to 5% by wet weight percent. In another aspect, the method further comprises adding a retarder in the range of 0.1 to 8% by wet weight percent. In another aspect, the retarder comprises sodium citrate, or a mixture of Plaster of Paris, sodium citrate and crystalline silica. In another aspect, the mixture has a clay-like consistency. In another aspect, the rheology modifying agent comprises a polysaccharide, a polysaccharide derivative, a protein, a protein derivative, a synthetic organic material, a synthetic organic material derivative, or a combination thereof. In another aspect, the polysaccharide comprises a cellulose-based material, a cellulose-based material derivative, a starch-based material, a starch-based material derivative, or a combination thereof. In another aspect, the cellulose-based material comprises methylhydroxyethylcellulose (MHEC), hydroxymethyl ethyl cellulose (HMEC), carboxymethylcellulose (CMC), methyl cellulose (MC), ethylcellulose (EC), hydroxyethylcellulose (HEC), hydroxyethylpropylcellulose (HEPC) or hydroxypropoylmethylluose (HPMC). In another aspect, the starch-based material comprises wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, or dialdehyde starches. In another aspect, the cement-based tile has a density in the range of about 1.4 to 2.4 g/cm$^3$, a compressive strength in the range of about 5 MPa to 100 MPa, and a flexural strength in the range of about 5 to 35 MPa. In another aspect, the secondary material is calcium carbonate or silica sand. In another aspect, the reinforcement fiber is PVA fiber. In another aspect, the cement-based tile comprises a roofing tile, a wall tile or a floor tile. In another aspect, the cement is in the range of about 40 to 55% by wet weight percent; the secondary material is in the range of about 20 to 40% by wet weight percent; the reinforcement fiber is in the range of about 1 to 5% by wet weight percent; the rheology modifying agent is in the range of about 0.5 to 2.5 by wet weight percent; and the water in the range of 15 to 25% of the total wet material weight. In another aspect, the cement is in the range of about 45 to 50% by wet weight percent; the secondary material is in the range of about 28 to 30% by wet weight percent; the reinforcement fiber is in the range of about 1.9 to 2.1% by wet weight percent; the rheology modifying agent is in the range of about 1.5 to 1.7 by wet weight percent; and the water in the range of 18 to 20% of the total wet material weight. In another aspect, extruding the mixture through the die using the extruder comprises: conveying the mixture through a barrel using an auger; and continuously forming the mixture into a final shape having form stability through the die using the extruder. In another aspect, the extruded mixture comprises an elongated sheet and further comprising rolling the elongated sheet through one or more sets of calenders. In another aspect, the method further comprises: cutting the elongated sheet into a set of individual sheets having a specified length; stacking the set of individual sheets onto a pallet; covering the stack with a plastic and an insulating material; curing the stack by allowing the covered stack to sit for a specified time period; and squaring up and sanding each individual sheet. In another aspect, the specified time period is approximately 24 to 48 hours. In another aspect, the extruded mixture or the molded mixture is allowed to set for up to 2 to 3 hours. In another aspect, the method further comprises curing the extruded mixture or the molded mixture. In another aspect, the method further comprises drying the extruded mixture or the molded mixture. In another aspect, the method further comprises cutting, trimming, sanding or routing the extruded mixture or the molded mixture into a specified shape. In another aspect, the method further comprises spraying the extruded mixture or the molded mixture with a water repellent. In another aspect, the method further comprises applying one or more coatings or inks to extruded mixture or the molded mixture. In another aspect, the one or more coatings or inks comprise a UV coating, a fire resistant coating, a color, an image, a texture or a combination thereof.

In another embodiment, the extrudable cement-based material (composite) can be made by the following steps: (1) metering all the ingredients for a batch into a mixer (e.g., Eirich intensive mixer, etc.) at the same time and mixing the ingredients; (2) dumping the mixture into a hopper and extruding the mixture through a die to form an elongated sheet; (3) rolling the elongated sheet through one or more sets of calenders (e.g., two sets, etc.) to a final thickness; (4) cutting the elongated sheet into a set of individual sheets having specified lengths; (5) picking up one or more of the individual sheets and placing them in a stack on a pallet; (6) covering the stack in a plastic and an insulating cover, and placing the stacks in a curing room for a specified period of time (e.g., 24 to 48 hours or other time period necessary to cure the individual sheets); (7) finishing each individual sheet (e.g., squaring up edges, sanding to smooth surfaces and exact dimensions; and (8) applying one or more coatings or inks to each individual sheet (e.g., UV coatings, fire resistant coatings, colors, images, texturing or a combination thereof via coating or printing processes).

Additional steps may include: (1) drying the extruded mixture; (2) curing the extruded mixture; (3) molding, cutting, trimming, sanding or routing the extruded mixture into a specified shape (e.g., a roofing tile, wall panel, etc.); (4) spraying the extruded mixture with a water repellent; and/or (5) decorating one or more surfaces of the extruded mixture by printing at least one image on the one or more surfaces or laminating a veneer on the one or more surfaces, or etching the at least one image on the one or more surfaces.

Following setting and drying of the finished product, the surface of the tile can be made water resistant with the use of silanes or surface coatings. Further, the surface can be decorated by printing onto the surface, by laminating veneer onto the surface or by printing "Nerewood" onto the surface. For example, U.S. Pat. No. 6,964,722 entitled "Method for Producing a Wood Substrate Having an Image on at Least One Surface" or U.S. Patent Application Ser. No. 61/713,240 and PCT Patent Application Serial No. PCT/US2013/064435 entitled "Method for Producing a Substrate Having an Image on at Least One Surface", all of which are hereby incorporated herein by reference in their entirety.

Although preferred embodiments of the present invention have been described in detail, it will be understood by those skilled in the art that various modifications can be made therein without departing from the spirit and scope of the invention as set forth in the appended claims.

What is claimed is:

1. A method for manufacturing a cement-based tile comprising:
mixing a cement in the range of about 0.1 to 88% by wet weight percent, a secondary material in the range of about 0.1 to 50% by wet weight percent, a reinforcement fiber in the range of about 0.5 to 20% by wet weight percent, and a rheology modifying agent in the range of about 0.5 to 10% by wet weight percent with a water in the range of 10 to 60% of a total wet material weight at a same time, wherein the secondary material comprises limestone, sand, silica sand, gypsum, silica fume, fumed silica, Plaster of Paris, calcium carbonate, fly ash, slag, rock, or a combination thereof, and the reinforcement fiber comprises cellulose fiber, glass fiber, plastic fiber, polypropylene fiber, polyvinyl alcohol (PVA) fiber, homopolymer acrylic fiber, alkali-resistant fiber, or a combination thereof;
extruding the mixture through a die using an extruder or molding the mixture using one or more molds; and
allowing the extruded or molded mixture to set.

2. The method as recited in claim 1, wherein the cement contains gypsum.

3. The method as recited in claim 1, wherein the mixing further comprises a color pigment in the range of about 0.1 to 5% by wet weight percent.

4. The method as recited in claim 1, wherein the mixing further comprises a retarder in the range of 0.1 to 8% by wet weight percent.

5. The method as recited in claim 1, wherein the mixture has a clay-like consistency.

6. The method as recited in claim 1, wherein the rheology modifying agent comprises a polysaccharide, a polysaccharide derivative, a protein, a protein derivative, a synthetic organic material, a synthetic organic material derivative, or a combination thereof.

7. The method as recited in claim 1, wherein the cement-based tile has a density in the range of about 1.4 to 2.4 g/cm3, a compressive strength in the range of about 5 MPa to 100 MPa, and a flexural strength in the range of about 5 to 35 MPa.

8. The method as recited in claim 1, wherein the secondary material is calcium carbonate or silica sand.

9. The method as recited in claim 1, wherein the reinforcement fiber is PVA fiber.

10. The method as recited in claim 1, wherein the cement-based tile comprises a roofing tile, a wall tile or a floor tile.

11. The method as recited in claim 1, wherein:
the cement is in the range of about 40 to 55% by wet weight percent;
the secondary material is in the range of about 20 to 40% by wet weight percent;
the reinforcement fiber is in the range of about 1 to 5% by wet weight percent;
the rheology modifying agent is in the range of about 0.5 to 2.5 by wet weight percent; and
the water in the range of 15 to 25% of the total wet material weight.

12. The method as recited in claim 1, wherein:
the cement is in the range of about 45 to 50% by wet weight percent;
the secondary material is in the range of about 28 to 30% by wet weight percent;
the reinforcement fiber is in the range of about 1.9 to 2.1% by wet weight percent;
the rheology modifying agent is in the range of about 1.5 to 1.7 by wet weight percent; and
the water in the range of 18 to 20% of the total wet material weight.

13. The method as recited in claim 1, wherein extruding the mixture through the die using the extruder comprising:
conveying the mixture through a barrel using an auger; and continuously forming the mixture into a final shape having form stability through the die using the extruder.

14. The method as recited in claim 1, wherein the extruded mixture comprises an elongated sheet and further comprising rolling the elongated sheet through one or more sets of calenders.

15. The method as recited in claim 14, further comprising:
cutting the elongated sheet into a set of individual sheets having a specified length;
stacking the set of individual sheets onto a pallet;
covering the stack with a plastic and an insulating material;
curing the stack by allowing the covered stack to sit for a specified time period; and
squaring up and sanding each individual sheet.

16. The method as recited in claim 15, wherein the specified time period is approximately 24 to 48 hours.

17. The method as recited in claim 1, wherein the extruded mixture or the molded mixture is allowed to set for up to 2 to 3 hours.

18. The method as recited in claim 1, further comprising curing the extruded mixture or the molded mixture.

19. The method as recited in claim 1, further comprising drying the extruded mixture or the molded mixture.

20. The method as recited in claim 1, further comprising cutting, trimming, sanding or routing the extruded mixture or the molded mixture into a specified shape.

21. The method as recited in claim 1, further comprising spraying the extruded mixture or the molded mixture with a water repellent.

22. The method as recited in claim 1, further comprising applying one or more coatings or inks to extruded mixture or the molded mixture.

23. The method as recited in claim 22, wherein the one or more coatings or inks comprise a UV coating, a fire resistant coating, a color, an image, a texture or a combination thereof.

24. A method for manufacturing a cement-based tile comprising:
mixing a cement in the range of about 0.1 to 88% by wet weight percent with a water in the range of 10 to 60% of a total wet material weight;
blending the cement-water mixture with a secondary material in the range of about 0.1 to 50% by wet weight percent and a reinforcement fiber in the range of about 0.5 to 20% by wet weight percent, wherein the secondary material comprises limestone, sand, silica sand, gypsum, silica fume, fumed silica, Plaster of Paris, calcium carbonate, fly ash, slag, rock, or a combination thereof, and the reinforcement fiber comprises cellulose fiber, glass fiber, plastic fiber, polypropylene fiber, polyvinyl alcohol (PVA) fiber, homopolymer acrylic fiber, alkali-resistant fiber, or a combination thereof;
adding a rheology modifying agent in the range of about 0.5 to 10% by wet weight percent;
extruding the mixture through a die using an extruder or molding the mixture using one or more molds; and
allowing the extruded or molded mixture to set.

25. The method as recited in claim 24, wherein the cement contains gypsum.

26. The method as recited in claim 24, further comprising adding a color pigment in the range of about 0.1 to 5% by wet weight percent.

27. The method as recited in claim 24, further comprising adding a retarder in the range of 0.1 to 8% by wet weight percent.

28. The method as recited in claim 24, wherein the mixture has a clay-like consistency.

29. The method as recited in claim 24, wherein the rheology modifying agent comprises a polysaccharide, a polysaccharide derivative, a protein, a protein derivative, a synthetic organic material, a synthetic organic material derivative, or a combination thereof.

30. The method as recited in claim 24, wherein the cement-based tile has a density in the range of about 1.4 to 2.4 g/cm3, a compressive strength in the range of about 5 MPa to 100 MPa, and a flexural strength in the range of about 5 to 35 MPa.

31. The method as recited in claim 24, wherein the secondary material is calcium carbonate or silica sand.

32. The method as recited in claim 24, wherein the reinforcement fiber is PVA fiber.

33. The method as recited in claim 24, wherein the cement-based tile comprises a roofing tile, a wall tile or a floor tile.

34. The method as recited in claim 24, wherein:
the cement is in the range of about 40 to 55% by wet weight percent;
the secondary material is in the range of about 20 to 40% by wet weight percent;
the reinforcement fiber is in the range of about 1 to 5% by wet weight percent;
the rheology modifying agent is in the range of about 0.5 to 2.5 by wet weight percent; and
the water in the range of 15 to 25% of the total wet material weight.

35. The method as recited in claim 24, wherein:
the cement is in the range of about 45 to 50% by wet weight percent;
the secondary material is in the range of about 28 to 30% by wet weight percent;
the reinforcement fiber is in the range of about 1.9 to 2.1% by wet weight percent;
the rheology modifying agent is in the range of about 1.5 to 1.7 by wet weight percent; and
the water in the range of 18 to 20% of the total wet material weight.

36. The method as recited in claim 24, wherein extruding the mixture through the die using the extruder comprising:
conveying the mixture through a barrel using an auger; and
continuously forming the mixture into a final shape having form stability through the die using the extruder.

37. The method as recited in claim 24, wherein the extruded mixture comprises an elongated sheet and further comprising rolling the elongated sheet through one or more sets of calenders.

38. The method as recited in claim 37, further comprising:
cutting the elongated sheet into a set of individual sheets having a specified length;
stacking the set of individual sheets onto a pallet;
covering the stack with a plastic and an insulating material;
curing the stack by allowing the covered stack to sit for a specified time period; and
squaring up and sanding each individual sheet.

39. The method as recited in claim 38, wherein the specified time period is approximately 24 to 48 hours.

40. The method as recited in claim 24, wherein the extruded mixture or the molded mixture is allowed to set for up to 2 to 3 hours.

41. The method as recited in claim 24, further comprising curing the extruded mixture or the molded mixture.

42. The method as recited in claim 24, further comprising drying the extruded mixture or the molded mixture.

43. The method as recited in claim 24, further comprising cutting, trimming, sanding or routing the extruded mixture or the molded mixture into a specified shape.

44. The method as recited in claim 24, further comprising spraying the extruded mixture or the molded mixture with a water repellent.

45. The method as recited in claim 24, further comprising applying one or more coatings or inks to extruded mixture or the molded mixture.

46. The method as recited in claim 24, wherein the one or more coatings or inks comprise a UV coating, a fire resistant coating, a color, an image, a texture or a combination thereof.

* * * * *